United States Patent [19]

Brassier et al.

[11] Patent Number: 5,894,272
[45] Date of Patent: Apr. 13, 1999

[54] LIGHTING AND/OR INDICATING MEANS FOR USE IN FOG

[75] Inventors: Marc Brassier, Vincennes; Charles Rydel, Paris, both of France

[73] Assignee: Valeo Vision, Bobigny Cedex, France

[21] Appl. No.: 07/891,435

[22] Filed: May 29, 1992

[30] Foreign Application Priority Data

May 29, 1991 [FR] France .................. 91 06477

[51] Int. Cl.⁶ ........................... G08B 21/00
[52] U.S. Cl. ........................... 340/602; 340/435
[58] Field of Search .................. 340/905, 942, 340/435, 903, 425.5, 939, 933, 601, 602; 342/26; 180/169; 250/574, 338.1; 356/4, 5

[56] References Cited

U.S. PATENT DOCUMENTS

| | | | |
|---|---|---|---|
| 2,907,889 | 10/1959 | Nichols | 340/602 X |
| 4,102,426 | 7/1978 | Walden | 180/169 |
| 4,636,643 | 1/1987 | Nakamura et al. | 250/338.1 |
| 4,871,054 | 10/1989 | Murray | 194/212 |
| 4,926,171 | 5/1990 | Kelley | 342/29 X |
| 5,146,209 | 9/1992 | Beghelli | 340/691 |

FOREIGN PATENT DOCUMENTS

| | | |
|---|---|---|
| 0072406 | 2/1983 | European Pat. Off. . |
| 2262612 | 2/1974 | France . |
| 2228367 | 11/1974 | France . |
| 2491648 | 10/1980 | France . |
| 2560353 | 2/1984 | France . |

*Primary Examiner*—Christine K. Oda
*Attorney, Agent, or Firm*—Morgan & Finnegan, LLP

[57] ABSTRACT

Apparatus for lighting and/or indicating purposes, on a vehicle such as a motor vehicle that has a rear fog lamp. The apparatus includes an electrical supply and a control circuit connecting the electrical supply to the fog lamp and/or an indicator. The control circuit is responsive to activating signals from a fog detector that is adapted to produce the activating signal when a condition of reduced visibility exists in the environment of the vehicle. This activating signal, moreover, is generated in response to electromagnetic waves reflected to a receiver coupled to the fog detector.

18 Claims, 8 Drawing Sheets

EMITTER

RECEIVER

| DRIVER'S SWITCH | STATES | | COMPONENT |
|---|---|---|---|
| | FOG | NO FOG | |
| OPEN | OFF | OFF | L1 |
| | FLASHING | OFF | L2 |
| | OPEN | OPEN | R1 |
| | OSCILLATES | OPEN | R2 |
| CLOSED | ON | OFF | L1 |
| | ON | OFF | L2 |
| | CLOSED | OPEN | R1 |
| | OPEN | OPEN | R2 |

FIG. 14

| DRIVER'S SWITCH | STATES | | COMPONENT |
|---|---|---|---|
| | FOG | NO FOG | |
| OPEN | ON | OFF | L1 |
| | ON | OFF | L2 |
| | CLOSED | OPEN | R1 |
| | CLOSED | OPEN | R2 |
| CLOSED | ON | OFF | L1 |
| | ON | OFF | L2 |
| | CLOSED | OPEN | R1 |
| | OPEN | OPEN | R2 |

FIG. 15

LIGHTING AND/OR INDICATING MEANS FOR USE IN FOG

FIELD OF THE INVENTION

This invention relates to lighting and/or indicating means for use in fog, and more particularly to fog lamp apparatus for a motor vehicle.

BACKGROUND OF THE INVENTION

The unwitting use of fog lamps, and more particularly the rear fog lamps which are intended for giving an indication to the drivers of following vehicles of the presence of the vehicle in which the rear fog lamps are installed, is dangerous to the drivers of those following vehicles when illumination of the rear fog lamps is not justified. The drivers of the following vehicles can be dazzled under these circumstances, and may be unable to distinguish quickly enough when, for example, the brake lights of the vehicle in front of them light up to show that the brakes are being applied. This can cause collisions.

DISCUSSION OF THE INVENTION

The object of the present invention is to overcome this disadvantage.

According to the invention, apparatus for lighting and/or indicating, for example a rear foglamp apparatus for a motor vehicle, comprising lighting and/or indicating means, is characterized in that it includes an electrical supply means and a control circuit connecting the electrical supply means to the said lighting and/or indicating means, the control circuit being responsive to activating signals from fog detector means, the latter being adapted to produce the said activating signal when a condition of reduced visibility exists in the environment in the path of light rays emitted by the said lighting and/or indicating means.

In a preferred embodiment of the invention, the control circuit is adapted firstly to authorize and/or cause electric power to be supplied to the lighting and/or indicating means, and consequently to cause the latter to be illuminated, when the fog detecting means detect the presence of a fog the opacity of which is greater than a predetermined first opacity threshold, the fog detector means being also adapted to cause the electrical supply to be interrupted or prevented, so as to extinguish the lighting and/or indicating means when the said fog detector means detect the absence of fog or the existence of fog having an opacity smaller than a predetermined second opacity threshold no greater than the said first opacity threshold.

According to another preferred feature of the invention, the said detector means include an emitter and a receptor for electromagnetic waves, the said emitter and receptor being disposed in the lighting and/or indicating apparatus, preferably side by side, and being directed outwardly from the apparatus.

Preferably, the said emitter and receptor for electromagnetic waves comprise an emitter and a receiver, respectively, for modulated infra red radiation, and comprise, respectively, at least one infra red emitting diode and at least one infra red receiving diode, together with a modulating circuit.

According to a further preferred feature of the invention, failure detecting means are provided which, being sensitive to a fault in the said detector means and/or in the said control circuit, are adapted to put the apparatus in a predetermined state which is either the illuminated or the extinguished state and which is preferably the illuminated state.

According to yet another preferred feature of the invention, the said control circuit includes timing means adapted to cause a change of state in the lighting and/or indicating apparatus to be effected only after the lapse of a predetermined period of time, during which the indication of the said fog detector means remains greater than a trigger value corresponding to the said first opacity threshold or less than a cancellation value corresponding to the said second opacity threshold.

Preferably, the said control circuit further includes selection means for activating a comparison of a signal emitted by the detector means with the said trigger value or with the said cancellation value, according to whether the lighting and/or indicating apparatus is, respectively, in the extinguished or illuminated state.

In one embodiment of the invention the said control circuit is automatically activated by illumination of the headlamps and/or indicators of the vehicle, in particular the cruising headlamps. In a variant, the said control circuit is activated when the headlamps and/or indicating lights of the vehicle are not illuminated, with a control interruptor for the vehicle lights and/or fog lights being closed at the same time.

In accordance with another aspect of the invention, the said control circuit includes information or warning means arranged to control a warning lamp on the fascia of the vehicle, in particular the lamp that is normally supplied for indicating that lighting or indicating means used in fog is in fact illuminated; in this aspect of the invention the warning lamp is arranged to flash so as to draw the driver's attention to the fact that he should switch on the fog lamps at the front and/or rear of the vehicle.

In a preferred form of the invention, the said detecting means are mounted within at least one indicator light cluster of a vehicle, which also includes within it the said lighting and/or indicating apparatus. Preferably, the said detecting means include at least one infra red emitting diode so disposed as to emit infra red radiation in a longitudinal direction with respect to the said cluster corresponding to the longitudinal direction of the vehicle, and at least one infra red receiving diode disposed close to the said emitting diode and orientated in a direction close to the said longitudinal direction, but making an angle therewith lying in the approximate range 5–45 degrees (and preferably approximately 15 degrees), with isolation means being provided for preventing any direct path between the emitting diode and the receiving diode.

Preferably the emitting and receiving diodes define directions of emission and reception that are inclined upwardly from a horizontal direction by an angle lying in the range between 5 and 45 degrees, and preferably about 20 degrees.

Preferably, the said modulating circuit and the said control circuit are arranged in the said cluster close to the said detecting means, behind a catadioptric element.

In a modification, the said control means include connecting means for connection to at least one further lighting and/or indicating apparatus, such that the control circuit simultaneously causes illumination and extinction of a pair of fog lamps or a pair of anti-fog headlamps, or headlamps and at least one fog lamp together.

In a receiver of the kind used in an apparatus according to the invention, and in particular (though it should be noted that this is not limited to an arrangement using infra red radiation), the input signal has to be filtered and amplified. The usable signal is weak because the surface of the diode is reduced in the manufacturing process for the diodes. This signal decreases as a function of the square of the distance separating the emitter from the receiver. It is therefore necessary in practice to extract noise signals.

Now, it is known that infra red noise is intense in ambient light. It is capable of masking the useful signal by saturating the receiving diode or by appearing to be an erroneous fog detecting signal. One very serious example of such noise consists of the emissions from fluorescent tubes, which are very prevalent in all kinds of industries and which emit radiation at about 950 nanometres frequency, modulated in amplitude by a multiple signal at the frequency of the current in the electrical distribution network. This signal, which is generally at 100 Hz, can interfere with the diffraction signals produced by infra red radiation in a turbid environment such as fog, if the usable, or service, signal is not filtered to the greatest possible extent.

Accordingly, it is a further object of the invention to provide a receiving circuit for receiving infra red signals which is of reduced sensitivity to environmental noise.

To this end, the present invention uses a filtering circuit having a transfer function that maximises the signal to noise ratio, in the infra red signal-receiving circuit which comprises at least one infra red receiving diode, characterized in that the filtering circuit includes an input stage comprising a compensation circuit adapted to maintain the operating point of the diode at a suitable level in accordance with the reception conditions.

Further features and advantages of the present invention will be understood more clearly from a reading of the description of preferred embodiments of the invention which follows, and which is given by way of example only and with reference to the accompanying drawings.

DESCRIPTION OF PREFERRED
EMBODIMENTS OF THE INVENTION

Figure 1:
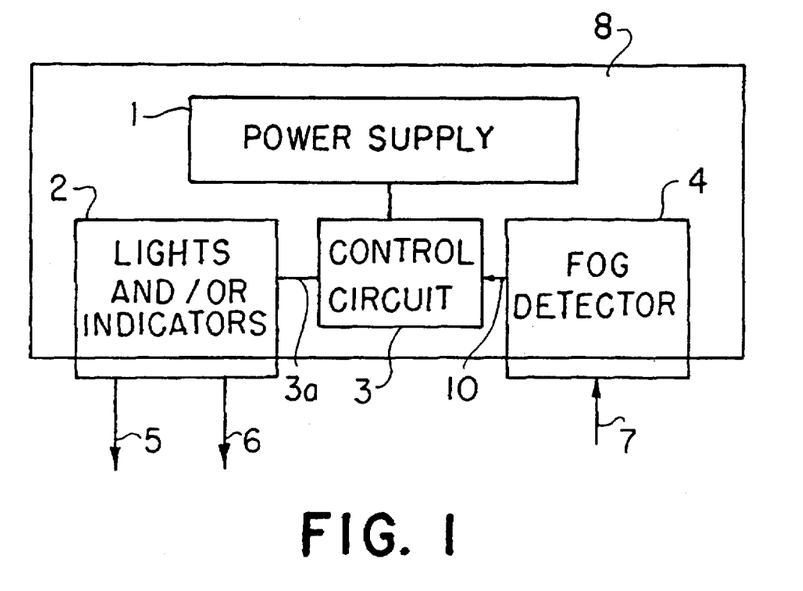
FIG. 1 is a block diagram for a lighting and/or indicating apparatus using a fog detector in accordance with the invention.

FIG. 1 is a generalised diagram of a lighting and/or indicating apparatus which is arranged to emit a light signal in the event of fog, and which has a fog detector in accordance with the present invention. This apparatus is indicated at 8, and includes electrical supply means 1, which may for example comprise the battery of the vehicle. A first terminal of the battery is connected through at least one cable to a lighting unit connector. The second terminal of the battery is connected to the chassis through a conventional plaited connecting strap. The apparatus 8 is also grounded to the chassis through a similar connecting strap, not shown.

The power source 1 transmits electrical energy to a control circuit 3. This control circuit is responsive to a control signal 10 emitted by a fog detector circuit 4 which is part of the apparatus 8. The control signal 10 controls the state of the control circuit 3, i.e. whether it is in an open circuit or a closed circuit state. Alternatively or in addition, the signal 10 controls the function of transfer of electric power from the power source 1. The control circuit 3 has an electric power output 3a which is connected to the input of a lighting/indicating unit 2. The latter is arranged to emit light for illumination purposes (as indicated at 5), and/or light for indicating purposes as indicated at 6.

The fog detector 4 receives a signal 7 representing the opacity of any fog present. This signal is converted into the electrical control signal 10 in accordance with a characteristic curve known in advance. The fog detector 4 carries out the test for at least one condition of activation. A positive result of this test for the condition of activation causes the control signal 10 to be initiated in accordance with parameters which are prerecorded in the detector circuit 4.

Figure 2:
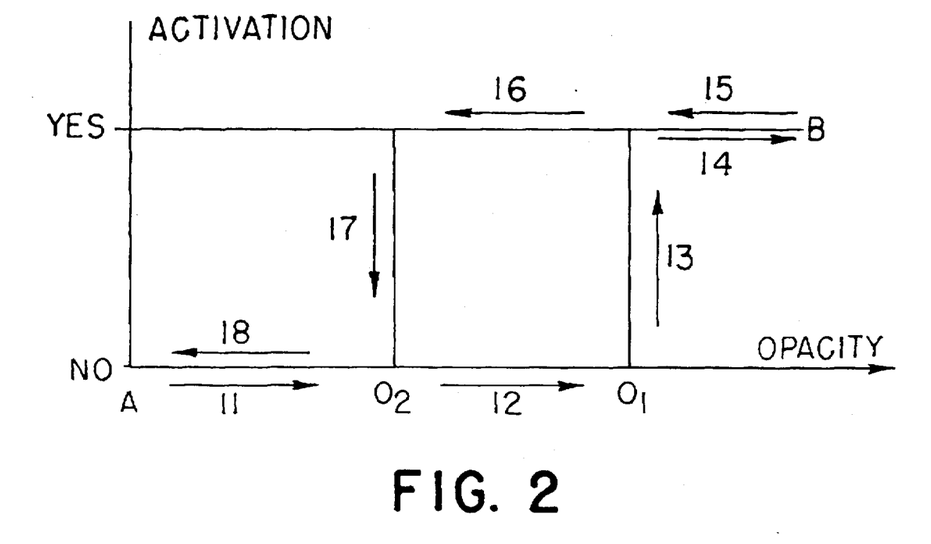
FIG. 2 is a diagram showing the relationship between actuation of the lighting and/or indicating apparatus of the invention and measurement of the degree of opacity of the fog.

FIG. 2 is an operating diagram for this test for determining whether the control signal 10 is to be given, as a function of the opacity 7 as measured by the fog detector 4. It will be noted that activation as indicated in the diagram of FIG. 2 is on an "all or nothing" basis, that is to say the diagram shows the operation of a method in which the control circuit 3 comprises an interrupter controlled by the circuit 10 and disposed in the electrical supply line connecting the lighting/indicating unit 2 to the electrical power source 1 in the apparatus 8 of FIG. 1. However, it will be understood that activation may alternatively be made to be progressive, so that the signal-initiating, or activating, lines in FIG. 2 then have gradients that are other than zero, and curved portions.

In the method represented in FIG. 2, at the start A of the operation, in the direction of the arrow 11, the fog detector 4 is inactive. At the point A, the control circuit 3 is open and the lighting/indicating unit 2 is not supplied with power.

When the opacity of the fog increases past an opacity level $O_2$ as indicated by the arrow 12 in FIG. 2, the fog detector 4 does not change the activation signal to the "high" level indicated by the YES line in FIG. 2. When the measured opacity according to the signal 7, FIG. 1, exceeds a first threshold value $O_1$, the fog detector 4 changes its state as indicated by the arrow 13 in FIG. 2, so converting to the high level at the output 10. This causes the interrupter of the control circuit 3 to switch, so as to complete the power supply circuit from the power source 1 to the lighting/indicating unit 2. In the example shown in FIG. 2, opacity of the fog may increase further as indicated by the arrow 14 in FIG. 2, up to a point indicated at B.

When the active state, for example at B in FIG. 2 is reversed as indicated by the arrow 15, the fog detector 4 gives a permanent or stable YES activation signal on its output 10 so long as the degree of opacity does not fall below a second opacity threshold value, which is the value $O_2$, smaller than the first opacity threshold value $O_1$ that caused initiation of activation of the control circuit 3. The activation diagram shows that at this lower threshold value $O_2$, the fog detector interrupts the control signal 10 as indicated by the arrow 17 in FIG. 2. If the opacity of the fog diminishes further, the system remains in its non-activated state and reverts to the point A as indicated by the arrow 18.

Figure 3:
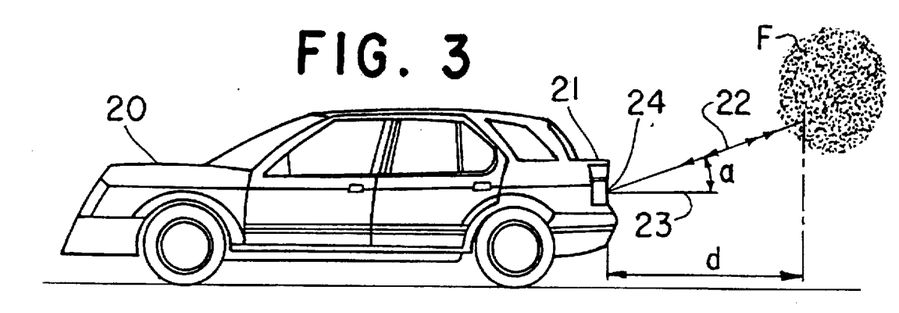
FIG. 3 is a side view of a vehicle having at least one lighting and/or indicating apparatus in accordance with the invention.
Figure 4:
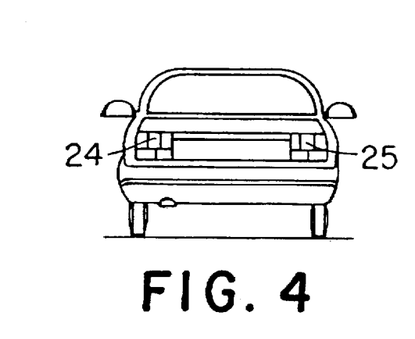
FIG. 4 is a rear view of the same vehicle.

Reference is now made to FIGS. 3 and 4, showing a vehicle having at least one apparatus of the general kind described above. The vehicle, 20, has two lighting/indicating units in the form of rear lighting clusters 24 and 25. At least one of the clusters 24 and 25 is equipped with a fog detector as generally shown in FIG. 1. In the following description the fog detector 4 of FIG. 1 will be taken to be an infra red detector, but it should be understood that this is by way of preferred example only. In such a fog detector, detection of the presence of fog is based on measurement of the retrodiffusion of infra red waves.

In a preferred embodiment of the apparatus, the retrodiffusion is excited by means of an infra red beam which is emitted by the fog detector circuit 4. However, in other possible embodiments, other infra red sources may be used.

It has been found that the intensity of reflection of an infra red signal by the fog, i.e. The degree of retrodiffusion of the infra red signal, is dependent in particular on the direction of its reception, and also on the wavelengths of the signal and the diameter of the sphere of reflection. In particular, on examination of the intensity of the reflected beam when the latter originates from a monochromatic source, it has been found that there are at least two values of the angle of reception at which the received intensity is hardly dependent at all on the size of the reflecting surface. Since the reflecting surface is characteristic of the opacity of the fog, it has been realised that by choosing a suitable wavelength for the infra red rays emitted, and a suitable direction in which to carry out the detection, such that the intensity of the received signal will be substantially independent of the wavelength and the size of the reflective surface, it will be possible easily to detect at least one threshold value of the opacity of the fog.

Thus, in FIG. 3 the beams 22 are directed at an angle "a" above the horizontal 23, towards a mass of fog F behind the vehicle. The angle "a" is chosen to have a suitable value in accordance with the principles just described, and in particular for detection of opacity of the fog in immediate proximity to the rear of the vehicle and also at the level of the eyes of the driver of a following vehicle not shown in FIG. 3. In this way the measurement of the opacity of the fog F, by a fog detector 4 in the light cluster 24, causes the fog lamp included in this cluster to be extinguished if opacity is not sufficient, i.e. is less than the threshold value $O_1$ in FIG. 2. It should be noted that in this example, this threshold value $O_1$ is that value below which propagation of the light from the rear fog lamp is uncomfortable for the driver of the following vehicle.

In automatic operation of the apparatus, when the opacity O of the fog F exceeds at least one detection threshold value $O_1$, the light cluster 24 may be switched automatically. This is an optional, though preferred, feature of the invention. In particular, techniques can be used that involve the driver in the cabin of the vehicle 20 using conventional means for controlling the indicator lights. The light cluster 24, in the example shown in FIG. 4, also has a fog detector circuit, so that the vehicle has two fog detectors. It will however be realised that alternatively, only one of the rear light clusters may be provided with a fog detector. The output of this fog detector, or fog density threshold value detector, is passed through an internal cable of the vehicle (not shown in FIG. 4) to both of the light clusters 24 and 25, each of these latter having the circuits 1, 3 and 2 described above with reference to FIGS. 1 and 2. In particular, both the detector circuit and the remainder of the electronic control module for the lighting/indicating unit are placed close to the latter, and preferably within the same housing.

Figure 5:
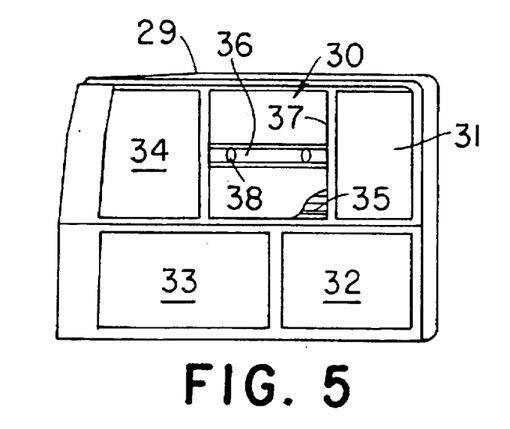
FIG. 5 is an elevation, seen from the rear of the vehicle, of a lighting and/or indicating apparatus in accordance with the invention.

Referring now to FIG. 5, a lighting/indicating unit or light cluster is here indicated at 29. Its main components are a brake light 34, a catadioptric element 30, a rear light 31, a flashing direction indicator 33, and a reversing light 32. In the preferred embodiment shown, the fog detector which is included in the electronic module of the cluster 29, includes electromagnetic wave emission means 37 and electromagnetic wave receiving means 38. In particular these electromagnetic waves are infra red for enabling the opacity or density of the fog to be measured. These emitting and receiving means are disposed in a central portion 36 of the catadioptric element 30. This arrangement has the particular advantage that the emitters 37 and the receptors 38 are not visible from outside, which improves the general appearance of the lighting/indicating unit 29.

Figure 6:
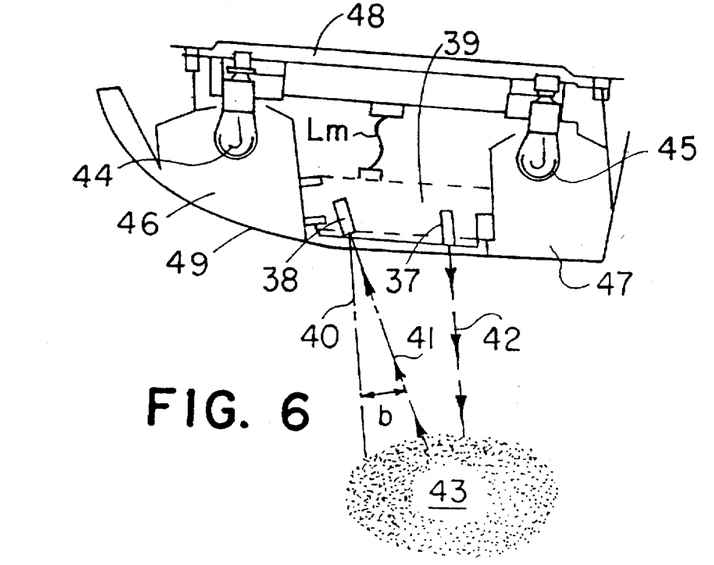
FIG. 6 is a top plan view of the same apparatus seen in cross section.

FIG. 6 is a transverse cross section of the cluster 29 shown in FIG. 5, as seen from above. FIG. 6 shows a support member 48 carrying the lamps 44 and 45 which are for example those of the stop light 34 and the rear light 31, and which propagate their light beams through lenses 46 and 47 respectively. As shown in the drawing, the lamps 44 and 45 are located at the foci of respective reflectors.

The electronic module forming part of the light cluster or lighting/indicating unit carries the emitter 37 and the receiver 38. The emitter 37 emits an infra red incident beam 42. The reflected beam received by the receiver 38 after reflection from the fog, here indicated at 43, is shown at 41. It will be noted that the incident infra red beam 42 lies in the plane containing the longitudinal axis 40 of the vehicle. By contrast, the direction of the reflected infra red beam 41 makes an angle of reception "b" with respect to the longitudinal axis 40 of the vehicle. Suitable choice of the angles "a" in FIG. 3 and "b" in FIG. 6 ensures good conditions for detection of the fog density or opacity signal, as will be described below.

The electronic module 39 is connected, in particular through a connection Lm, to the lamps 44 and 45, and also to electrical supply means which are not shown in the drawing. It will be noted that the whole apparatus may be arranged in a reduced space. It will also be noted that it can be fitted within a space the same as that of standard commercially available components.

The apparatus may be incorporated in an overall control system of the whole vehicle in which the control signals are multiplexed. To this end, the lighting and/or indicating apparatus may be connected to the general power supply means of the vehicle through an intelligent interrupter of a known kind.

FIG. 7 shows in diagrammatic form an infra red emitter means in two preferred embodiments of the invention (FIGS. 7 (a) and 7 (b) respectively). The emitter consists in both cases mainly of an emitter diode 51 for emitting infra red radiation and arranged at the base end of a tube 52 for collimating the infra red radiation emitted by the diode 51.

In FIG. 7 (b), the infra red radiation 53 leaving the tube 52 passes through a flat zone 54 in which the infra red radiation passes through the glass 55 of the catadioptric element. In the embodiment shown in FIG. 7 (b), the catadioptric element 55 has an output face 56 which is flat, and an internal face 57 which is formed in a curve adapted to focus the infra red radiation on the focus 58 on the axis of transmission of the infra red radiation, which extends beyond the focus 58 in an incident beam 59.

In the other embodiment of FIG. 7 (a), the catadioptric element 55 is formed with a window for passage of the infra red radiation through it, having its two faces 56 and 57 both flat. However in this case the output end of the infra red radiation collimating tube 52 lies in line with an intermediate optic 60. This intermediate optic 60 focuses the infra red radiation 62 on a convergence focus 61.

FIGS. 7 (c) and 7 (d) show two embodiments of an infra red receptor means or receiver, as examples of the receiver 38 in FIG. 6. In FIG. 7 (c), an infra red diode 64 is arranged at the base of a collimating tube 65. The input end 66 of the collimating tube is arranged in line with a convergent collimating optic 67. The catadioptric element 55 is formed with a through window 68 which has an input face 69 and an output face 70, for an infra red beam 71 reflected by the ambient fog. This reflection or retrodiffusion produces mainly divergent infra red rays, and the collimating optic 67 collects these rays together to form a parallel and/or convergent beam.

In the alternative embodiment shown in FIG. 7 (d), the collimating optic 67 is absent. However, the catadioptric element 55 is here formed with a window for passage of the infra red radiation 71 through it, in which an input face 72 is flat, while the output face 73 of the window is made convex in such a way as to convert the input or reflected beam 71 into parallel or convergent rays, constituting a beam 74 incident on the collimating tube 65.

Figure 7A:
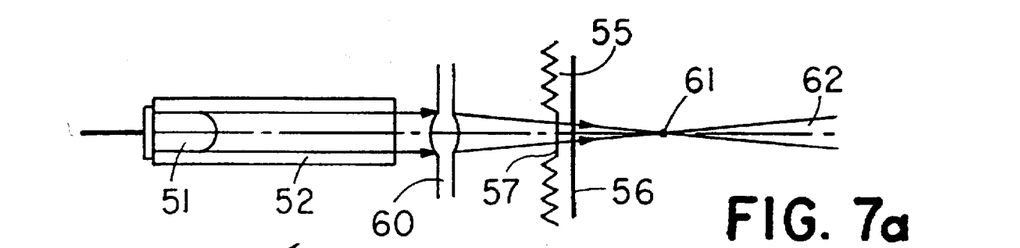
FIG. 7 consists of four similar diagrams, denoted as FIGS. 7 (a) to (d) respectively, each showing infra red emitter and receptor means, which may or may not be associated with an intermediate optical element, all being for use in an apparatus in accordance with the invention.
Figure 7B:
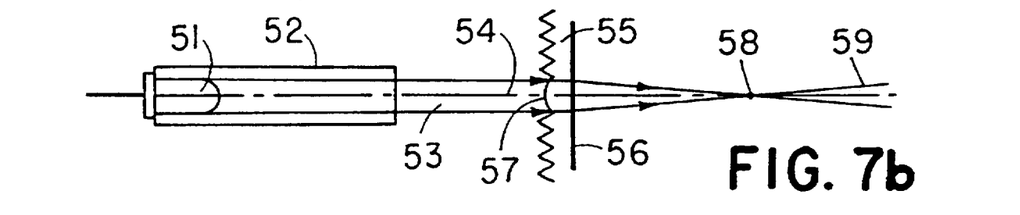
Figure 7C:
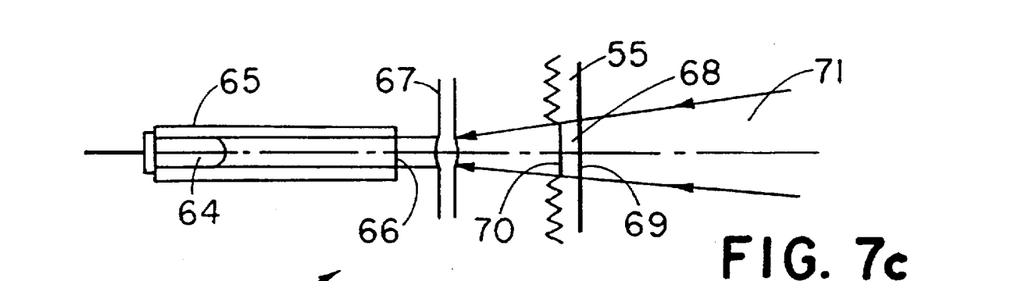
Figure 7D:
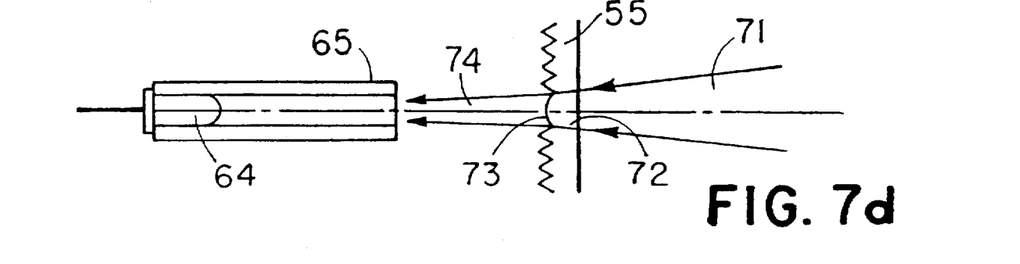

The interposition of a lens on the receptor enables the field of detection to be increased, and thus improves the sensitivity of detection. In the emitter, the lens 60 or 57, 56 enables the point at which opacity of the fog is measured to be accurately focused.

Figure 8:
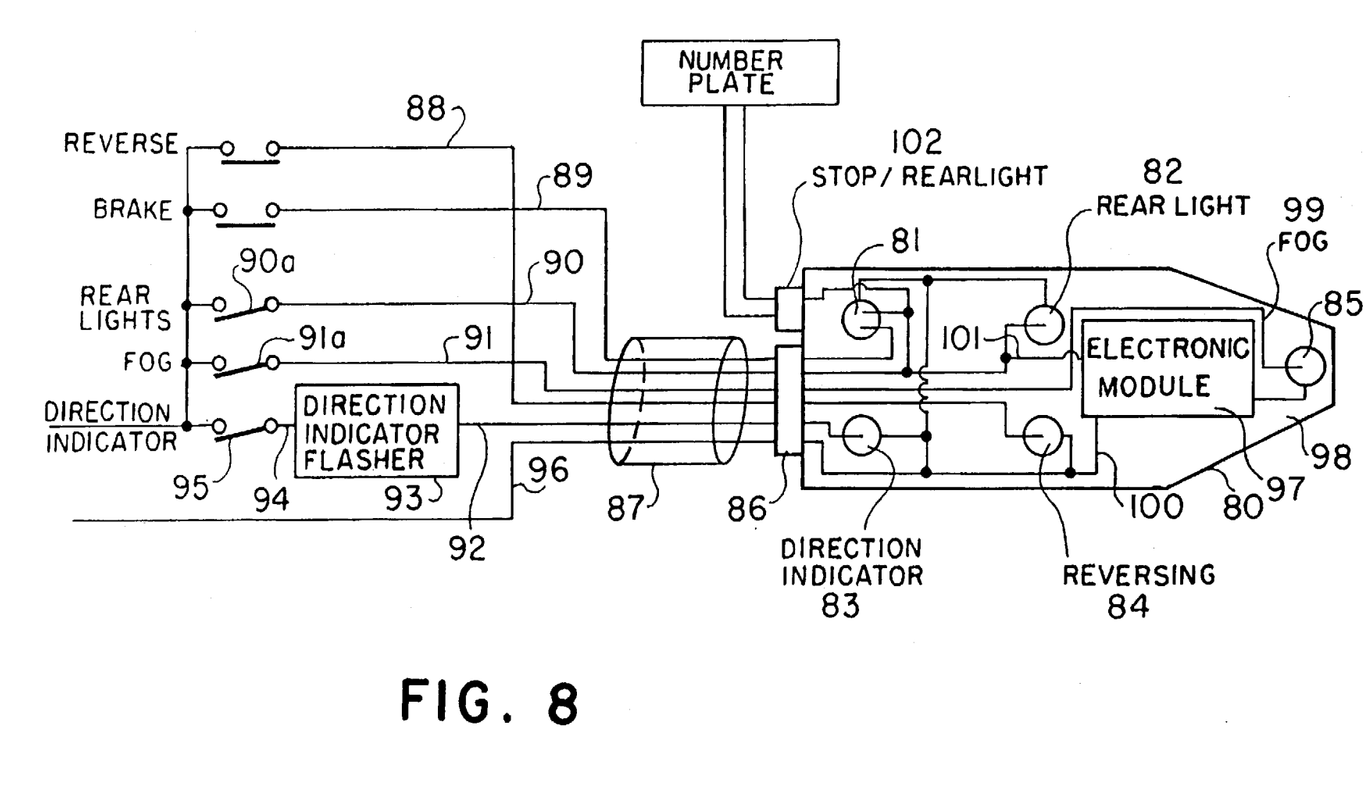
FIG. 8 is a diagram showing one embodiment of an apparatus in accordance with the invention, installed in a motor vehicle.

Referring now to FIG. 8, this shows a general scheme for a lighting and/or indicating apparatus 80 which is integrated in a vehicle. The apparatus 80 includes at least five lamps, namely a stop lamp 81, a rear lamp 82, an intermittent direction indicator 83, a reversing light 84, and a fog light 85. These various lamps are controlled through a connector 86 which delivers both control signals and electrical energy through a cable bundle 87 arranged within the vehicle (not shown).

In particular, the cable 87 includes at least the following wires:

a wire 88 connected to the gear change lever when the latter is in the reverse gear position;

a wire 89 connected to the brake pedal and/or hand brake lever;

a wire 90 which connects the driver's switch 90a for the rear lights to a respective terminal of the stop lights 81 and rear lights 82;

a wire 91 which connects the driver's switch 91a for controlling the fog lights 85;

a wire 94 which connects the driver's switch 95 for the flashing direction indicators to the input of the flasher unit 93 actuating the direction indicators, with the output of the flasher unit 93 being connected through a wire 92 to the connector 86; and a general electrical supply wire 96 of the vehicle. This wire 96 has one end which may be connected typically to the positive terminal of the battery of the vehicle.

The apparatus 80 also includes an electronic module, here indicated by the reference numeral 97, which includes the fog detector circuit already described. The electronic module 97 has an output wire 98 which is connected to a supply terminal of the fog light 85. The other supply terminal of the fog light 85 is connected through a wire 99 to the connector 86. This wire 99 is in direct connection with the wire 91 of the bundle 87. Thus when the fog detecting electronic module 97 detects a significant opacity in the atmosphere around the vehicle, it emits an activating signal which causes electric power to be transmitted through the wire 98. However, the fog light is illuminated only if the driver operates the switch 91a mounted in the cabin of the vehicle.

In other embodiments, the fog light switch 91a is normally closed, and is opened only when the driver does not wish the fog lights to be illuminated, or when the onboard computer prevents it being illuminated in spite of the positive signal from the electronic module 97.

The electronic module 97 also has output wires 100 and 101 which are connected to at least one terminal of the four lamps 81, 82, 83 and 84.

Figure 9:
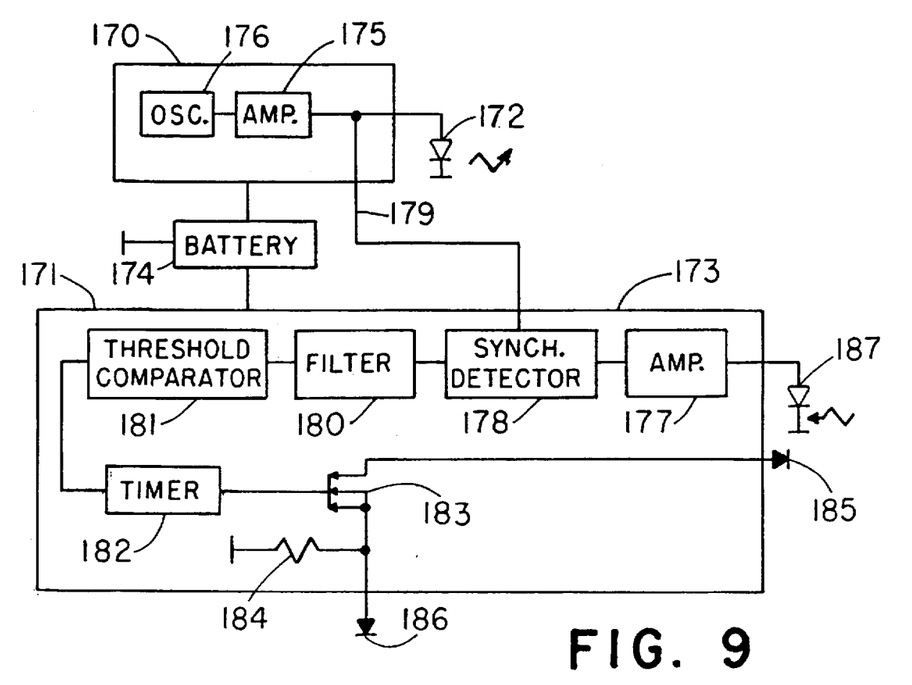
FIG. 9 is a diagram showing an electronic module in an apparatus of the kind shown in FIG. 8.

Referring now to FIG. 9, this shows in greater detail one embodiment of the electronic module 97 shown generally in FIG. 8. This module consists principally of an emitter section 170 and a receiver section 171, both of which are powered by means of electrical supply means 174, which typically comprise the battery of the vehicle. The positive voltage from the battery is transmitted to a regulator and to an over-voltage limiter, both of which are integrated within the circuit 174. The circuit 174 has two outputs, sending signals respectively to the emitter section 170 and the receiver section 171.

The emitter section 170 consists principally of at least one infra red diode 172, for emitting infra red radiation which is modulated by an oscillator 176 and which is transmitted through its output connected to the input of an amplifier 175. The output of the amplifier 175 is connected to the cathode of the diode 172, the anode of which is connected to ground or the negative terminal of the power supply.

The receiver section 171 consists mainly of an infra red receiving diode 187, the cathode of which is connected to ground while its anode is connected to the input of an amplifier 177 for shaping the signal. The output of the amplifier 177 is connected to a first input of a synchronous detection circuit 178, a second input of which is connected through a wire 179 to the output of the amplifier 175 of the emitter section 170. By synchronous detection it is possible to detect a signal arising from retrodiffusion or reflection from fog consequent on emission of infra red radiation by the emitter diode 172.

The output of the synchronous detector 178 is connected to a filter 180 which filters the signal in specific ways, for example in the case of the circuit of FIG. 11 to be described below. The output signals of the synchronous detector 178, thus filtered, are delivered to a threshold comparator 181, which carries out the operation shown in FIG. 2. The comparator accordingly provides two reference levels representing the threshold values $O_1$ and $O_2$. The output signals from the threshold comparator 181 are transmitted to the input of a timer circuit 182, which gives a predetermined time delay such as to eliminate any flickering of the lamp. The output signals from the timer are transmitted to the control electrode of a power interrupter 183, which consists of a field effect power transistor. The source of this field effect power transistor is connected to one terminal of the fog lamp, while its drain is connected to ground through a resistor. As has already been seen with reference to FIG. 8, the other terminal of the lamp is connected to the positive terminal of the battery of the vehicle.

Figure 10:
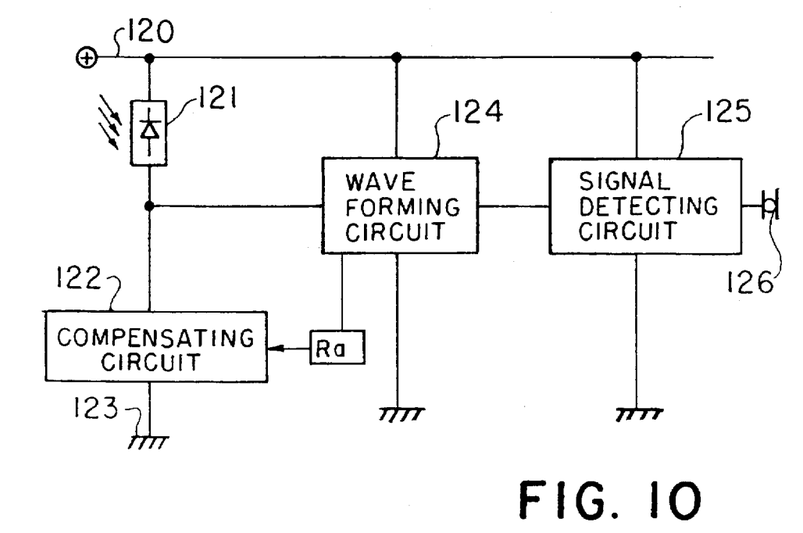
FIG. 10 shows one embodiment of an amplifier forming part of the circuit shown in FIG. 9.

FIG. 10 is a block diagram showing the preferred arrangement of the amplifier 177 of FIG. 9, and is arranged to be powered through a connection to the power supply means, here indicated at 120, of the apparatus. The circuit includes an infra red receiving circuit 121 having either a single infra red receiving diode, or a plurality of infra red receiving diodes connected in parallel with each other. The cathode of each receiving diode in the circuit 121 is connected to the positive terminal 120 of the battery, while the anode of each receiving diode is connected to ground at 123 through a compensating circuit 122. The purpose of the compensating circuit 122 is to maintain the operating point of the infra red receiving diodes at a level such as, in particular, to compensate for the presence of electric current due to the presence of daylight.

The common point between the anodes of the infra red receiving diodes and the compensating circuit 122 is connected to a further circuit 124. This is a wave forming circuit which includes a filter which is designed to maximise the signal to noise ratio. The output signal from the circuit 124 is passed to a signal detecting circuit 125, which detects the input signal responsive to the infra red signal. The output of the circuit 125 carries one terminal of a fog lamp 126.

In the arrangement shown in FIG. 10, the compensating circuit 122 maintains the voltage across the terminals of the reception circuit 121 at a constant level, thus avoiding saturation of the infra red receiving diodes during detection of an infra red signal. In addition, noise is in effect reduced since the filter 124 maximises the signal to noise ratio.

Figure 11:
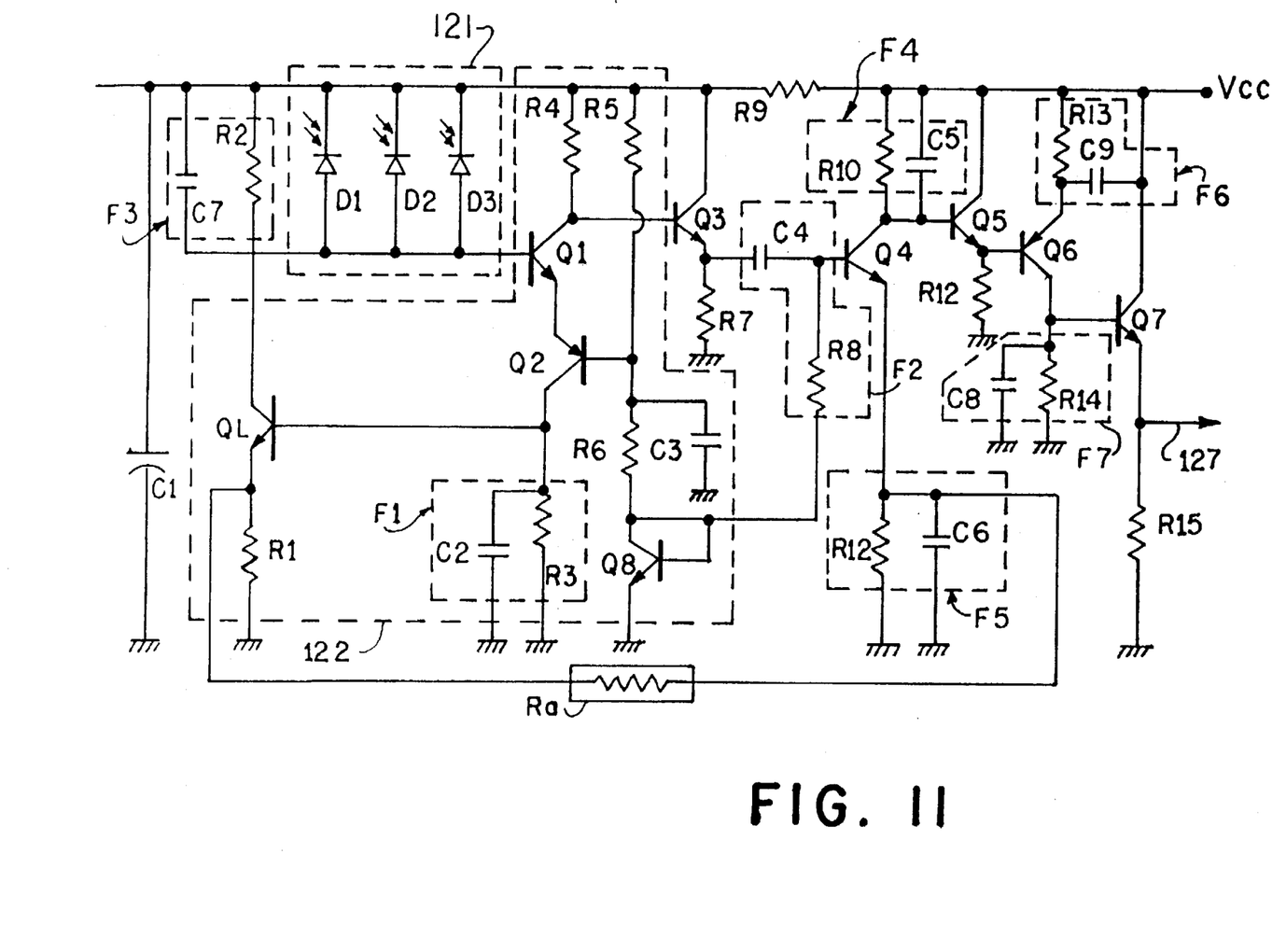
FIG. 11 shows one embodiment of the amplifier, arranged to effect filtering which is adapted to the fog detection signal in accordance with the arrangement shown in FIG. 10.

FIG. 11 shows in detail one preferred form of the amplifier shown in FIG. 10. FIG. 11 shows the receiver circuit 121 as having three diodes D1, D2, D3 mounted in parallel, and also shows the compensating circuit 122. The output of the receiver circuit 122 is connected to the first input of a differential amplifier comprising transistors Q1 and Q2. The anodes of the three diodes in the receiver circuit 121 are connected together to the base of the detecting transistor Q1, the collector of which is connected to the positive supply terminal Vcc through a resistor R4. The transistor Q1 serves to detect the current flowing through the diodes D1 to D3, and has two outputs, namely a first output on its collector, from which signals are transmitted to the base of a third transistor Q3, and a second output on the emitter of Q1, which is connected to the emitter of the complementary second transistor Q2 of the differential amplifier. The collector output from the transistor Q2 is transmitted to the control electrode of a fourth transistor QL, the collector-emitter path of which connects the anodes of the infra red diodes D1 to D3 to a fixed potential, for example ground.

The transistor Q2 is of a first PNP type, while the transistors Q1 and Q3 are of a second, NPN, type. The base of the transistor Q2 is polarised through a line which connects it through a resistor R5 to the power supply Vcc, and also to ground through a resistor R6.

The compensating circuit 122 is in fact a feedback circuit acting as a synthetic inductance and consisting mainly of the transistor QL together with a high pass filter F1 comprising a resistor R3 and a capacitor C2. This filter receives the output from the differential amplifier Q1, Q2. In a modification, not shown, the compensating circuit consists of a feedback circuit which is constructed around one or more operational amplifiers.

The use of direct current, particularly because of the usable signal, does not comprise a succession of pulses, reduces the static consumption of the arrangement shown in FIG. 11 by a greater amount than in corresponding arrangements in the prior art. Tests have shown that the current consumption is 210 microamperes in this improved embodiment, in the absence of illumination.

The circuit described above is thus adapted for use in a vehicle in which the greatest possible reduction in current consumption is required. This is desirable for example when it is desired to reduce the cross section of the electrical supply wires, or in the case of multiplexing with the electrical system of the motor vehicle.

In addition, a band pass filter is provided for rejecting parasitic signals, such as those having a frequency that is a multiple of that of the electrical frequency in the supply network (100 Hz). Such a filter comprises, in particular, a filter in one or more of the following seven forms. However, in the preferred embodiment, it consists of all seven forms integrated together. These are:

- a first filter, which is the high pass filter F1, comprising the resistor R3 mounted in parallel with the capacitor C2 and connected on the collector of the transistor Q2; this filter mainly determines the characteristics of the synthetic inductance provided by the transistor QL;

- a second filter F2, which is a high pass filter comprising a capacitor C4 in series with the output of the amplifying transistor Q3, and with the base of a fifth transistor Q4 which acts as a buffer; the capacitor C4 is also connected in series with a resistor R8 which is connected between the base of the transistor Q4 and a point of injection of current on the polarising line of the second inverter transistor Q2 of the differential amplifier;

- a third filter F3, which is a low pass filter employing a Miller effect on the input of the transistor Q1 and applying, in particular, a resistor R2 connected in parallel with the capacitor C7 on the diode circuit for infra red detection;

- a fourth filter F4, comprising a resistor R10 and a capacitor C5 connected in parallel between the collector of the transistor Q4 and the supply Vcc;

- a fifth filter F5, comprising a resistor R10 and a capacitor C6 which are connected both to the collector of the transistor Q4 and to ground;

- a sixth filter F6, comprising a resistor R13 which is connected between the collector of a sixth transistor Q6 and a collector of a seventh transistor Q7, which is an output transistor; and

- a seventh filter F7 comprising a resistor R14 and a capacitor C8, which are connected in parallel between the emitter of the transistor Q6 and ground.

The values of the various components of this circuit are not indicated here, because they depend on the characteristics of the signal to be emitted. They can be worked out by an ordinary person skilled in the art having regard to the objects of the present invention.

Further filters may be added where they will offer advantage in particular applications. Examples include, in particular, decoupling filters for the transistors, in which the filter comprises the resistor R9 and the capacitor C1, in the form of an electrolytic condenser, which decouples the supply of the transistors Q4 and Q3, and so on. The electrolytic condenser C1 has a very low impedence at high frequencies. In addition, the base of the second transistor Q2 of the differential amplifier is polarised between the battery voltage and ground, by means of two resistors R5 and R6 which are decoupled to ground through a capacitor C3 which is connected to the base of the transistor Q2.

In an improved embodiment in the absence of illumination, tests have shown that the circuit of the kind described above gives a bottom cut-off frequency at the base of the transistor Q3 of about 8 Hz, and a top cut-off frequency of about 8 KHz. The whole amplifier gives a voltage gain of the order of 30 dB.

The transistors Q4 and Q6 are connected respectively with a resistor R10 and a capacitor C5, a resistor R11 and a capacitor C6, and a resistor R12, in such a way as to augment the overall gain and to cut off low frequencies by means of capacitors C6 and C8, and high frequencies by means of the capacitors C5 and C9.

It will be noted that the transistors Q3 and Q5 are mounted in a common collector mode. They constitute two buffer stages which enable the input resistance to be increased to a value which is proportional to the resistance of the resistors R7 and R12, and which also reduces output resistance with a gain very slightly less than unity. Q5 in particular provides temperature compensation for Q6.

The transistor Q8, which acts as the point of injection mentioned above, is a transistor of the kind adapted to provide temperature compensation for the transistor Q4, by compensating for the temperature induced variation in the base-emitter voltage of the transistor Q4 by means of the base-emitter voltage of the transistor Q8. The output stage of the filter circuit 122 enables the transistor Q7 to operate in a blocked state, so as to restore the point of polarisation of the emitter of the transistor Q7 to zero. A usable signal is thus obtained without a shift in the DC voltage.

In another embodiment, an output voltage is taken from the emitter of the transistor Q4, and is then applied by way of feedback to the emitter of the transistor QL, thus constituting an apodictic or verifying circuit. In a preferred embodiment, this circuit comprises a series resistor Ra. In general terms and as shown in FIG. 10, verification is carried out by means of a circuit Ra which injects a voltage proportional to the DC flow detected by the diodes, and reinjects it into the input of the compensating circuit 122. In this way, even if the level of noise changes during reception of an infra red signal, it is ensured that only the fraction of the signal detected above a threshold which changes with the noise will be transmitted as a service signal.

The whole of the circuit between the base of the transistor Q1 and the emitter of the transistor Q7 connected to the pulse decoding circuit gives an attenution of 40 dB per decade at low frequencies, and an attenuation of 60 dB per decade at high frequencies, with a band width of about 6 KHz–3 dB.

Figure 12:
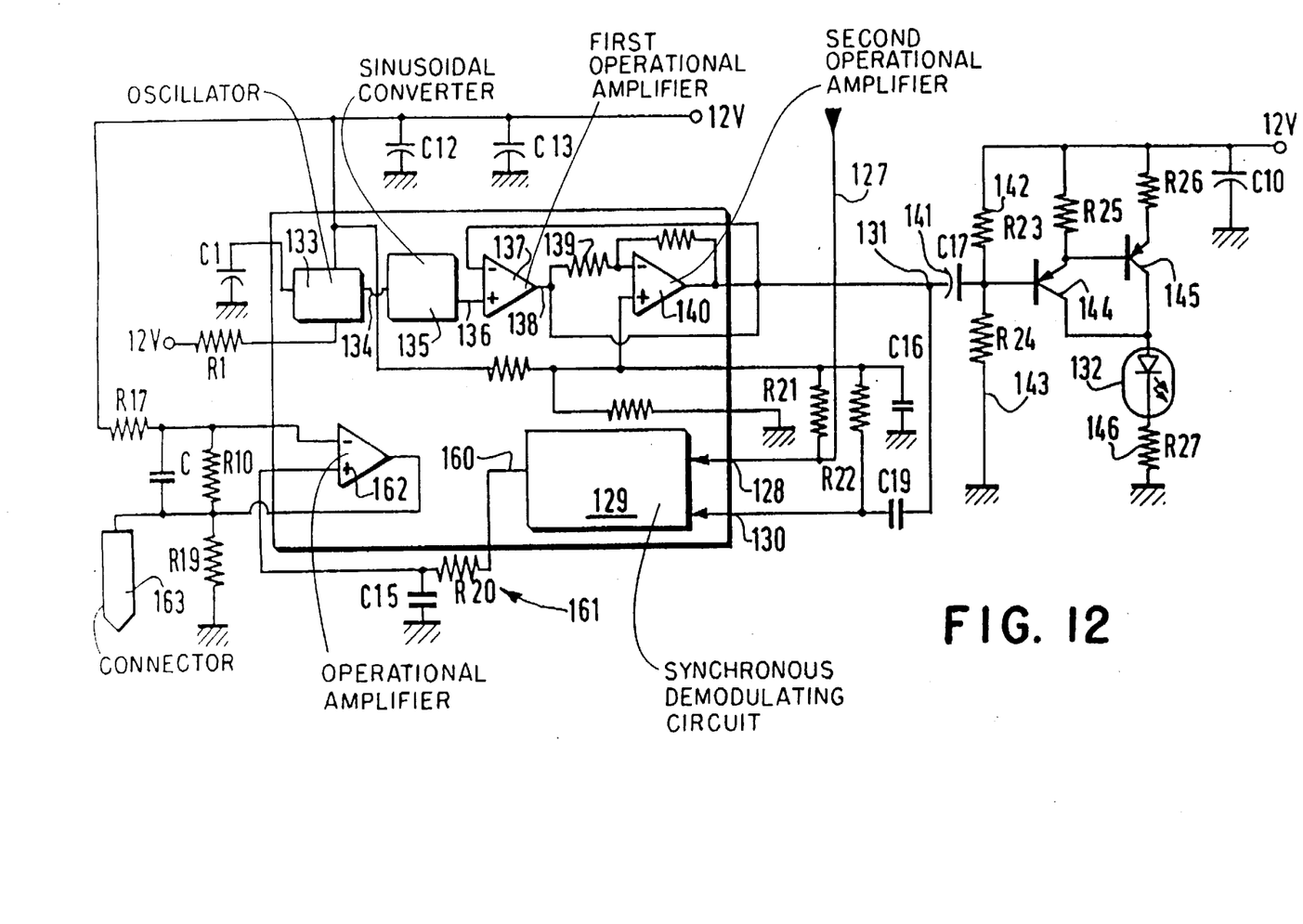
FIG. 12 shows one embodiment of oscillator circuits for actuating the infra red emitter means, and for synchronous detection, in the embodiment shown in FIG. 9.

Referring now to FIG. 12, this shows the remainder of the electronic module using the infra red receptor shown in FIG. 11. The output of the circuit 127 of FIG. 11 is connected to an input 128 of a synchronous demodulating circuit 129. Another input 130 of the circuit 129 is connected to an input 131 for the activation signal for causing an infra red emitter diode 132 to emit an infra red signal.

Activation of the input 130 and activation of the diode 132 are obtained by means of an oscillator 133, one output 134 of which is connected to the input of a sinusoidal converter 135. The output 136 of the converter 135 passes signals to the input of an impedance adapting circuit which consists mainly of a first operational amplifier 137 having a gain of unity. The output 138 of the operational amplifier 137 is connected through a load resistor 139 to a further amplifier which is constructed around a second operational amplifier 140. The output of the amplifier 140 is connected to the activation input 131 for the emitter diode 132.

Signals from the input 131 are transmitted to a coupling capacitor 141, the other side of which is connected to the common point of two resistors 142 and 143 that constitute a voltage dividing bridge. This common point of the voltage dividing bridge is connected to the base of a first transistor 144 of the circuit of FIG. 12. The emitter of the transistor 144 is connected to the base of a second transistor 145 so as to constitute a Darlington circuit.

The collectors of the two transistors 144 and 145 are connected to the anode of the infra red emitter diode 132. The cathode of the latter is connected to ground via a load resistor 146.

Reverting to the receptor circuit, the synchronous demodulating circuit 129 has an output 160 which is connected to a filter 161 comprising a resistive-capacitive circuit the output of which is connected to the input of a comparator constructed about an operational amplifier 162. The output of the operational amplifier 162 is connected to a connector 163, which is in turn connected to a switching transistor for switching the power supply to the lighting and/or indicating lamps.

Figure 13:
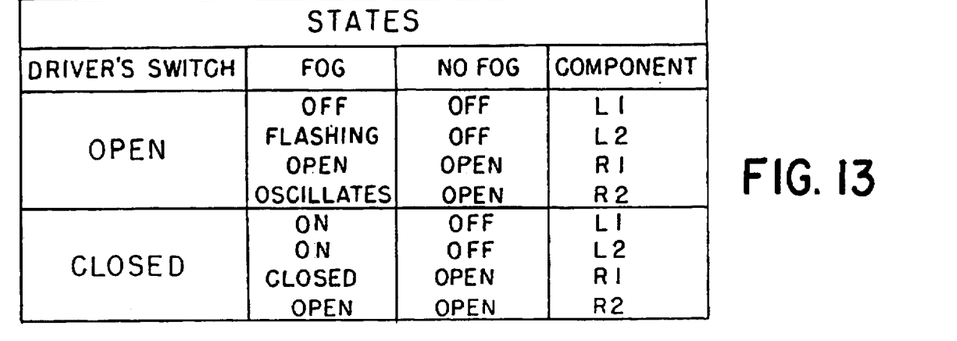
FIGS. 13 and 14 are two tables showing two possible operating procedures, given by way of example only.
Figure 14:
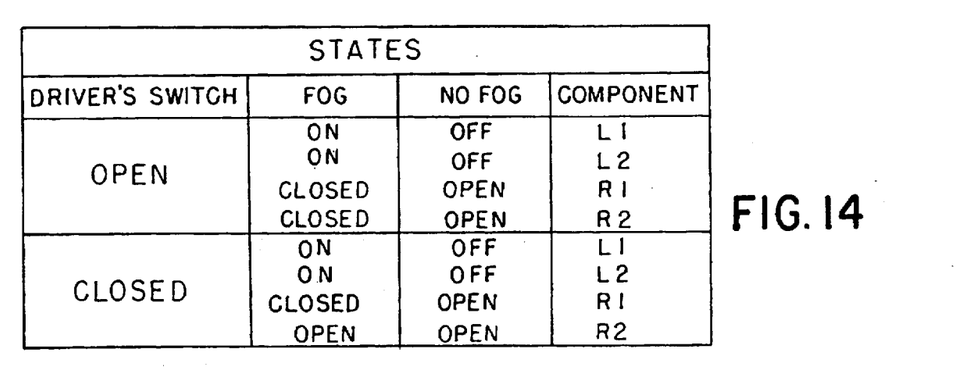
Figure 15:
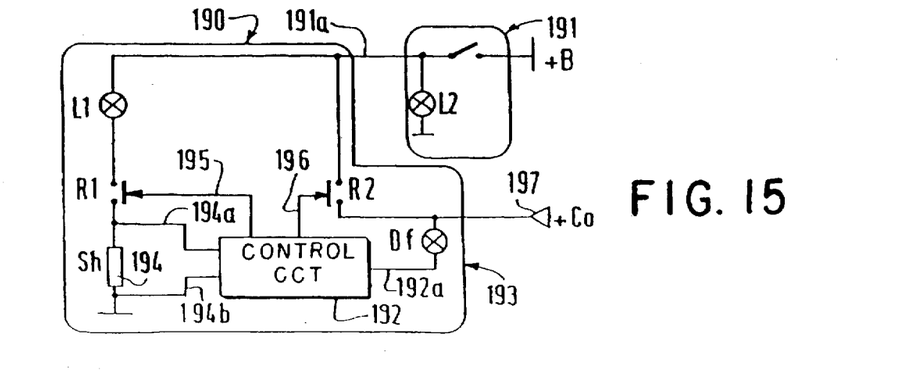
FIG. 15 shows diagrammatically an operating logic circuit which is employed in the invention.

FIGS. 13 and 14 show two operating modes for fog lamps in a lighting and/or indicating apparatus shown in FIG. 15. In FIG. 15, there is mainly shown part of the electronic circuit board 190 fitted in a fog lamp unit, together with part of the control unit which is mounted in the cabin of the vehicle.

The control unit 191 includes the driver's operating switch for switching on the fog light L1, together with a warning light L2 indicating that the lamp L1 is illuminated. The common point between the switch and the lamp is connected through a wire, or through any other suitable means, to the circuit board 190. In this example, the control circuit of the circuit board 190 is only energised when the operating switch in the control unit 191 is closed, that is to say only when the driver switches on the lights. Thus the circuit 190 is energised through the output 191a from the control unit 191. In another embodiment, however, the control circuit 190 is connected directly to the positive power supply (+APC) giving a positive voltage after the ignition switch has been closed. In particular, this connection may be made by multiplexing. The fog lamp L1 is mounted in the circuit board 190, and may be replicated in a plurality of different units, which may be separate from each other or not, and which are connected in parallel on the wire 191a.

The base of the lamp L1 is connected to ground through a controlled interruptor R1. In one embodiment, this controlled interrupter consists of an electromagnetic relay. In another embodiment, the relay is replaced by a field effect power transistor.

The circuit board 190 includes an electronic control circuit 192 for giving control signals on an output line 195. It is arranged to produce these signals, for opening or closing the controlled interrupter R1, on receipt of validation signals from the fog detector (which is not shown in FIG. 15). When the driver's switch in the control unit 191 is closed, the positive electrical supply from the battery is transmitted to the circuit board 190. A second wire, connected from the line that connects the circuit board 190 to the control unit 191, is connected through a second controlled interrupter R2 to the rear lights 197. The electronic control circuit 192 gives a control signal 196 to the control electrode of the controlled interrupter R2.

The controlled interruptor R1 is connected to ground through a shunt resistor 194, which, through two connections 194a and 194b to the control circuit, enables the current passing through the fog lamp to be measured. If, when the signal 195 is active, there is no current flowing through the shunt resistor 194, the electronic circuit (which includes a current measuring circuit between its two inputs 194a and 194b) emits on its output 192a a signal that indicates failure of the fog lamps. This signal may be given remotely, for example in the cabin of the vehicle by illumination of a warning lamp Df which can be provided specifically for warning of fog lamp failure. In another embodiment, the message drawing the driver's attention to the failure of the fog lamp is of a vocal type produced by a voice synthesiser.

In response to closure of the driver's switch in the control unit 191, together with the fog detecting signal received by the control circuit 192, the latter may cause the fog lamp either to be illuminated or not to be illuminated, in a number of different ways. Two such modes of operation, representing two different embodiments, are indicated in FIGS. 13 and 14 respectively, in which the different states of the system are shown for each embodiment. In the first column, the open or closed state of the driver's switch in the control unit 191 (by manual control) is shown. The extreme right hand column of each table relates to the elements shown in FIG. 15 and comprising the lamp L1, the warning light L2, and the controlled interruptors R1 and R2, for the open state of the driver's switch and for its closed state. The two middle columns of each table indicate the state of these four elements according to whether or not fog is being detected.

Referring therefore to FIG. 13, when the fog detector is active, and if the driver's switch is open, indicating that the driver does not wish the rear lights 197 to be illuminated, then the fog light L1 is not illuminated, and the warning light L2 flashes intermittently when the controlled interrupter R1 is open. When there is no fog, neither the lamp L1 nor the warning light L2 is illuminated, while the relays R1 and R2 are open.

When the driver's switch is closed, in the situation in which fog is detected by the fog detector, the relay R1 is closed while the relay R2 may be either open or closed. If the detector transmits an invalid signal, the lamps L1 and L2 are extinguished and the relays R1 and R2 are open.

In the mode of operation illustrated in FIG. 14, the various states of the four circuit elements shown in the extreme right hand column is the same except in the case in which the driver's switch is open, with fog being detected. Here the warning light L2 remains continuously lit. It will of course be realised that any other mode of operation is possible within the scope of the present invention.

What is claimed is:

1. Rear fog lamp apparatus for activating the rear fog lamp in the presence of a fog, the opacity of which is greater than a predetermined first opacity threshold and less than a second predetermined opacity threshold for a vehicle comprising electromagnetic wave emitting means for emitting electromagnetic waves therefrom, electrical supply means, a control circuit connecting the electrical supply means to the electromagnetic wave emitting means, and fog detector means detecting the opacity of the fog upon which the emitted electromagnetic waves are incident through the intensity of the emitted electromagnetic waves reflected by the opacity of the fog to the fog detector means, the fog detector means transmitting to the control circuit the activation signal on detecting fog opacity upon which the electromagnetic waves are incident greater than the first predetermined opacity threshold to energize the fog lamp apparatus in response thereto, and to transmit to the control circuit a signal to deenergize the fog lamp apparatus in response to fog opacity upon which the electromagnetic waves are incident less than the second predetermined opacity threshold.

2. Rear fog lamp apparatus for activating the rear fog lamp in the presence of a fog, the opacity of which is greater than a predetermined first opacity threshold for a vehicle comprising electromagnetic wave emitting means for emitting electromagnetic waves therefrom, electrical supply means, a control circuit connecting the electrical supply means to the electromagnetic wave emitting means, and fog detector means detecting the opacity of the fog upon which the emitted electromagnetic waves are incident through the intensity of the emitted electromagnetic waves reflected by the opacity of the fog to the fog detector means, the fog detector means transmitting an activation signal to the control circuit in response thereto, the fog detector means transmitting to the control circuit the activation signal on detecting fog opacity upon which the electromagnetic waves are incident greater than the first predetermined opacity threshold to energize the fog lamp apparatus, and to transmit to the control circuit a signal to deenergize the fog lamp apparatus in response to fog opacity upon which the electromagnetic waves are incident less than a second predetermined opacity threshold at most equal to the first threshold, timing means defining a predetermined time delay, the control circuit means responding to the activation signal only when the fog detector means detects throughout the time delay a fog opacity greater than the first predetermined opacity threshold or less than the second predetermined threshold.

3. Rear fog lamp apparatus for activating the rear fog lamp in the presence of a fog, the opacity of which is greater than a predetermined first opacity threshold for a vehicle comprising light emitting means for emitting light therefrom, electrical supply means, a control circuit connecting the electrical supply means to the light emitting means, and fog detector means connected to the control circuit, the fog detector means detecting the opacity of the fog upon which the emitted light is incident through the intensity of the emitted light reflected by the opacity of the fog to the fog detector means, the fog detector means transmitting an activation signal to the control circuit to energize the rear fog lamp apparatus on detecting fog opacity upon which the emitted light is incident greater than the first predetermined threshold and to transmit to the control circuit another signal in response to fog opacity upon which the emitted light is incident being less than a second predetermined threshold at most equal to the first threshold to deenergize the rear fog lamp apparatus, timing means coupled to the control circuit to define a predetermined time delay, the control circuit transmitting the activation signal when the signal received from the fog detector means detects throughout the time delay a fog opacity upon which the emitted light is incident greater than the first threshold or less than the second threshold, means coupled to the control circuit for activating a comparison of the activation signal and the other signal emitted by the fog detector means in response to the respective first and second threshold conditions in synchronism with the illumination of the light emitting means.

4. Rear fog lamp apparatus activating the rear fog lamp in the presence of a fog, the opacity of which is greater than a predetermined first opacity threshold for a vehicle comprising electromagnetic wave emitting means for emitting electromagnetic waves therefrom, electrical supply means, a control circuit connecting the electrical supply means to the electromagnetic wave emitting means, and fog detector means detecting the opacity of the fog upon which the emitted electromagnetic waves are incident through the intensity of the emitted electromagnetic waves reflected by the opacity of the fog to the fog detector means, the fog detector means transmitting an activation signal to the control circuit in response thereto, the fog detector means transmitting to the control circuit the activation signal on detecting fog opacity upon which the electromagnetic waves are incident greater than the first predetermined opacity threshold, to energize the fog lamp apparatus, and to transmit to the control circuit a signal to deenergize the fog lamp apparatus in response to fog opacity upon which the electromagnetic waves are incident less than a second predetermined opacity threshold at most equal to the first threshold, a fog lamp failure detection means responsive to a fault in at least one of the fog detector means, the control circuit having a measuring circuit for producing a signal in response to the fog lamp failure that activates the fog lamp failure detection means to generate a fog lamp failure signal.

5. Apparatus according to claim 1, wherein the control circuit, generates a control signal, and a warning light responsive to said control signal to indicate that there is the first predetermined threshold condition of reduced visibility.

6. Apparatus according to claim 5, wherein the control circuit further generates an information signal, the warning light having coupled thereto the information signal from the control circuit, and electrical supply means coupled to said control circuit for activating the warning light in response to said fog detector activation signal.

7. Apparatus according to claim 1, further comprising a rear light, rear light switch means for selectively energizing the rear light and for automatically energizing the control circuit on activation of the switch means in response to said fog detector activation signal.

8. Rear fog lamp apparatus activating the rear fog lamp in the presence of a fog, the opacity of which is greater than a predetermined first opacity threshold for a vehicle comprising electromagnetic wave emitting means for emitting electromagnetic waves therefrom, electrical supply means, a control circuit connecting the electrical supply means to the electromagnetic wave emitting means, and fog detector means detecting the opacity of the fog upon which the emitted electromagnetic waves are incident through the intensity of the emitted electromagnetic waves reflected by the opacity of the fog to the fog detector means, the fog detector means transmitting an activation signal to the control circuit in response thereto, the fog detector means transmitting to the control circuit the activation signal on detecting fog opacity upon which the electromagnetic waves are incident greater than the first predetermined opacity threshold at most equal to the first threshold, a rear light, rear light switch means for selectively energizing the rear light and for automatically energizing the control circuit on activation of the switch means, and coupling the control circuit to the electrical supply means to energize the control circuit when the switch means is activated to deenergize the rear light.

9. Apparatus according to claim 1, wherein the fog detector means further comprises an electromagnetic wave emitter and an electromagnetic wave receiver in which the emitter and the receiver are arranged side by side.

10. Rear fog lamp apparatus for activating the rear fog lamp in the presence of a fog, the opacity of which is greater than a predetermined first opacity threshold for a vehicle comprising electromagnetic wave emitting means for emitting electromagnetic waves therefrom, electrical supply means, a control circuit connecting the electrical supply means to the electromagnetic wave emitting means, and fog detector means detecting the opacity of the fog upon which the emitted electromagnetic waves are incident through the intensity of the emitted electromagnetic waves reflected by the opacity of the fog to the fog detector means, the fog detector means transmitting an activation signal to the control circuit in response thereto, the fog detector means transmitting to the control circuit the activation signal on detecting fog opacity upon which the electromagnetic waves are incident greater than the first predetermined opacity threshold to energize the fog lamp apparatus, and to transmit to the control circuit a signal to deenergize the fog lamp apparatus in response to fog opacity upon which the electromagnetic waves are incident less than a second Predetermined opacity threshold at most equal to the first threshold, an electromagnetic wave emitter and an electromagnetic wave receiver in which the emitter and the receiver are arranged side by side, wherein the electromagnetic wave emitter and the electromagnetic wave receiver for modulated infra red radiation have at least one infra red emitting diode for emitting infra red electromagnetic waves and at least one infra red receiving diode for receiving infra red electromagnetic waves emitted from said emitting diode and reflected by the opacity of the fog to the receiving diode, and a modulating circuit connected to at least one of the emitting and receiving diodes in order to synchronously detect the modulated infra red radiation through the intensity of the modulated infra red radiation reflected by the opacity of the fog.

11. Apparatus according to claim 9 for the vehicle comprising at least one indicating light cluster, wherein the electromagnetic wave emitter and the electromagnetic wave receiver are mounted within the cluster.

12. Apparatus according to claim 9 for the vehicle having at least one indicating light cluster, wherein the electromagnetic wave emitter and the electromagnetic wave receiver are mounted within the indicating light cluster, the electromagnetic wave detecting means comprises at least one infra red emitting diode oriented to emit infra red radiation in a longitudinal direction relative to the cluster and aligned with a longitudinal direction of the vehicle, and the electromagnetic wave receiver is at least one infra red receiving diode disposed close to the emitting diode and oriented in a direction inclined relative to the longitudinal direction by an angle of approximately 5 to 45 degrees, and isolating means in order to prevent direct communication between the electromagnetic wave emitter and the electromagnetic wave receiver.

13. Apparatus according to claim 12, wherein the emission orientation of the at least one infra red emitting diode also is inclined upwardly from the horizonal by an angle of approximately 5 to 45 degrees in the longitudinal direction of the vehicle.

14. Apparatus according to claim 10 for the vehicle having at least one indicator light cluster, the cluster including a catadioptric element, and the modulating circuit and the control circuit being mounted in the cluster behind the catadioptric element.

15. Apparatus according to claim 1 for the vehicle comprising a pair of anti-fog headlights, the control circuit further including connections to control the simultaneous and selective activation of the rear fog lights and the pair of anti-fog headlights in response to said fog detector activation signal.

16. Rear fog lamp apparatus for activating the rear fog lamp in the presence of a fog, the opacity of which is greater than a predetermined first opacity threshold for a vehicle comprising electromagnetic wave emitting means for emitting electromagnetic waves therefrom, electrical supply means, a control circuit connecting the electrical supply means to the electromagnetic wave emitting means, and fog detector means detecting the opacity of the fog upon which the emitted electromagnetic waves are incident through the intensity of the emitted electromagnetic waves reflected by the opacity of the fog to the fog detector means, the fog detector means transmitting an activation signal to the control circuit in response thereto, the fog detector means transmitting to the control circuit the activation signal on detecting fog opacity upon which the electromagnetic waves are incident greater than the first predetermined opacity threshold to energize the fog lamp apparatus, and to transmit to the control circuit a signal to deenergize the fog lamp apparatus in response to fog opacity upon which the electromagnetic waves are incident less than a second predetermined opacity threshold at most equal to the first threshold, an electromagnetic wave emitter and an electromagnetic wave receiver in which the emitter and the receiver are arranged side by side for said fog detector means, and collimating means coupled to the electromagnetic wave emitter, and another collimating means coupled to the electromagnetic wave receiver.

17. Apparatus according to claim 16 further comprising optically convergent elements wherein each of the convergent optical elements are individually focused relative to a respective electromagnetic wave emitter and electromagnetic wave receiver for focusing the electromagnetic waves that are incident thereon.

18. Apparatus according to claim 17, comprising a wall separating the apparatus from the fog, the wall comprising a concave surface, the electromagnetic wave emitter and electromagnetic wave receiver forming with the wall and the respective convergent optical elements individual optical alignments with the associated electromagnetic wave receiver and emitter.

* * * * *